United States Patent [19]

Ho

[11] Patent Number: 5,507,658

[45] Date of Patent: Apr. 16, 1996

[54] EJECTOR MECHANISM FOR MEMORY CARD CONNECTOR WITH VARIABLY POSITIONABLE PUSHING BLOCK MEANS

[75] Inventor: Yu-Ming Ho, Taipei Hsieh, Taiwan

[73] Assignee: Hon Hai Precision Ind. Co., Ltd., Taiwan

[21] Appl. No.: 318,428

[22] Filed: Oct. 5, 1994

[51] Int. Cl.⁶ ................................................. H01R 13/62
[52] U.S. Cl. ........................... 439/159; 361/754; 361/157
[58] Field of Search ................................. 439/153, 155, 439/157, 152, 159–160; 16/114 R; 361/754

[56] References Cited

U.S. PATENT DOCUMENTS

| | | | |
|---|---|---|---|
| 4,810,200 | 3/1989 | Sakamoto | 439/155 |
| 4,952,161 | 9/1990 | Komatsu | 439/155 |
| 5,026,296 | 6/1991 | Hashiguchi | 439/159 |
| 5,145,389 | 9/1992 | Okubo | 439/159 |
| 5,149,276 | 9/1992 | Dixon | 439/159 |
| 5,152,697 | 10/1992 | Abe et al. | 439/152 |
| 5,161,989 | 11/1992 | Okubo et al. | 439/159 |
| 5,197,894 | 3/1993 | Koike | 439/159 |
| 5,286,207 | 2/1994 | McHugh | 439/64 |
| 5,305,180 | 4/1994 | Mitchell et al. | 361/685 |

*Primary Examiner*—David L. Pirlot
*Assistant Examiner*—Jill DeMello

[57] ABSTRACT

A memory card connector (10) includes an insulative housing (20) having a plurality of cavities (26) extending therethrough in a front-to-end direction for reception of a corresponding number of contacts therein. Ejection mechanism includes a pivotal lever (70) adapted to be rotatable with regard to the housing (20), and an actuation bar (80) adapted to be lengthwise moved wherein such lever (70) and actuation bar (80) are linked with each other. A pushing block (90) positioned on the actuation bar (80), has a pushing or operation surface (95) which laterally projects out of the lengthwise axis (Z) of such actuation bar (80) so that the actuation bar (80) can be rearwardly moved by easily manually approaching such operation surface (95) from an exterior, thus actuating such pivotal lever (70) to rotationally move for ejection of the memory card inserted within the connector (10).

13 Claims, 8 Drawing Sheets

EJECTOR MECHANISM FOR MEMORY CARD CONNECTOR WITH VARIABLY POSITIONABLE PUSHING BLOCK MEANS

BACKGROUND OF THE INVENTION

1. Field of the Invention

The invention relates to ejector mechanism for use with memory card connectors, especially to separate different pushing blocks adapted to be attached to the actuation bar of such ejector mechanism for the convenience of operation under different situation.

2. The Prior Art

Memory card connectors are popularly used in the recent computer industry. Most memory card connectors are arranged with ejector mechanism for the convenience of withdrawal of the inserted memory cards, for example, U.S. Pat. Nos. 4,810,200, 4,843,221, 4,952,161, 5,011,420, 5,026,296, 5,033,972, 5,051,101, 5,139,435, 5,145,389, 5,149,276, 5,152,697, 5,161,989, 5,197,894, 5,286,207, 5,286,214, 5,299,946, 5,304,070, 5,316,488, 5,324,204, and 5,330,363. Moreover, some of such designs provide their ejector mechanism with spring devices for helping the moveable actuation bar in a steady ready-position regardless of whether the memory card is inserted in the memory card connector. The spring devices used with memory card connectors, can be seen in U.S. Pat. Nos. 4,810,200, 4,810, 203, 4,904,852, 4,952,161, 4,961,710, 4,984,994, and 5,026, 296.

Most traditional ejector mechanism with an integral elongated actuation or ejector bar has an exposed operation tip at its longitudinal outermost end for the convenience of operatively pushing thereagainst forwardly so that the memory card which is inserted within the memory card connector can be rejected therefrom via a lever function. Unfortunately, in some situations which are restrained by the customer's requirements and/or the structure limitation, the actuation position with the actuation bar may be altered from the front tip of the actuation bar which is aligned with a lengthwise axis of the actuation bar, to another position which is adjacent to the actuation bar in an above or aside position, even though the actuation force is still operated in a front-to-end direction. Most conventional memory card connectors each of which has only one pushing button at its outermost ends along its lengthwise axis, can not efficiently meet this operation requirement.

Other problems are found that the integral plastic actuation bar takes too much space with regard to the whole plane dimension of the connector set, thus influencing the layout of the circuit design of the PC board on which the memory card connector is mounted. In contrast, reducing the dimension of such actuation bar may be helpful for such circuit design on the board, but may jeopardize the strength of the actuation bar. In addition, if the spring function of the actuation bar is asked by the customer, the structure of the whole actuation bar may often be redesigned in an significant manner, that increases the whole cost.

Therefore, one of the object of this invention is to provide a universal structure of the ejector mechanism adapted to attach different pushing blocks thereto for the convenience of actuating such actuation bar from different originate positions.

Another object of the invention is to provide a metal type ejector bar which can be not only movably positionable of the insulative housing of the memory card connector, but also easily loaded with a spring for achieving a recovery condition regardless of whether any memory card is inserted within the memory card connector.

SUMMARY OF THE INVENTION

According to an aspect of the invention, a memory card connector includes an insulative housing having a plurality of cavities extending therethrough in a front-to-end direction for reception of a corresponding number of contacts therein. Ejection mechanism includes a pivotal lever adapted to be rotatable with regard to the housing, and an actuation bar adapted to be lengthwise moved wherein such lever and actuation bar are linked with each other. A pushing block positioned on the actuation bar, has a pushing or operation surface which laterally projects out of the lengthwise axis of such actuation bar so that the actuation bar can be rearwardly moved by easy manually approaching such operation surface from an exterior, thus actuating such pivotal lever to rotationally move for ejection of the memory card inserted within the connector.

DETAILED DESCRIPTION OF THE PREFERRED EMBODIMENT

References will now be made in detail to the preferred embodiments of the invention. While the present invention has been described with reference to specific embodiments, the description is illustrative of the invention and is not to be construed as limiting the invention. Various modifications to the present invention can be made to the preferred embodiments by those skilled in the art without departing from the true spirit and scope of the invention as defined by appended claims.

Figure 1:
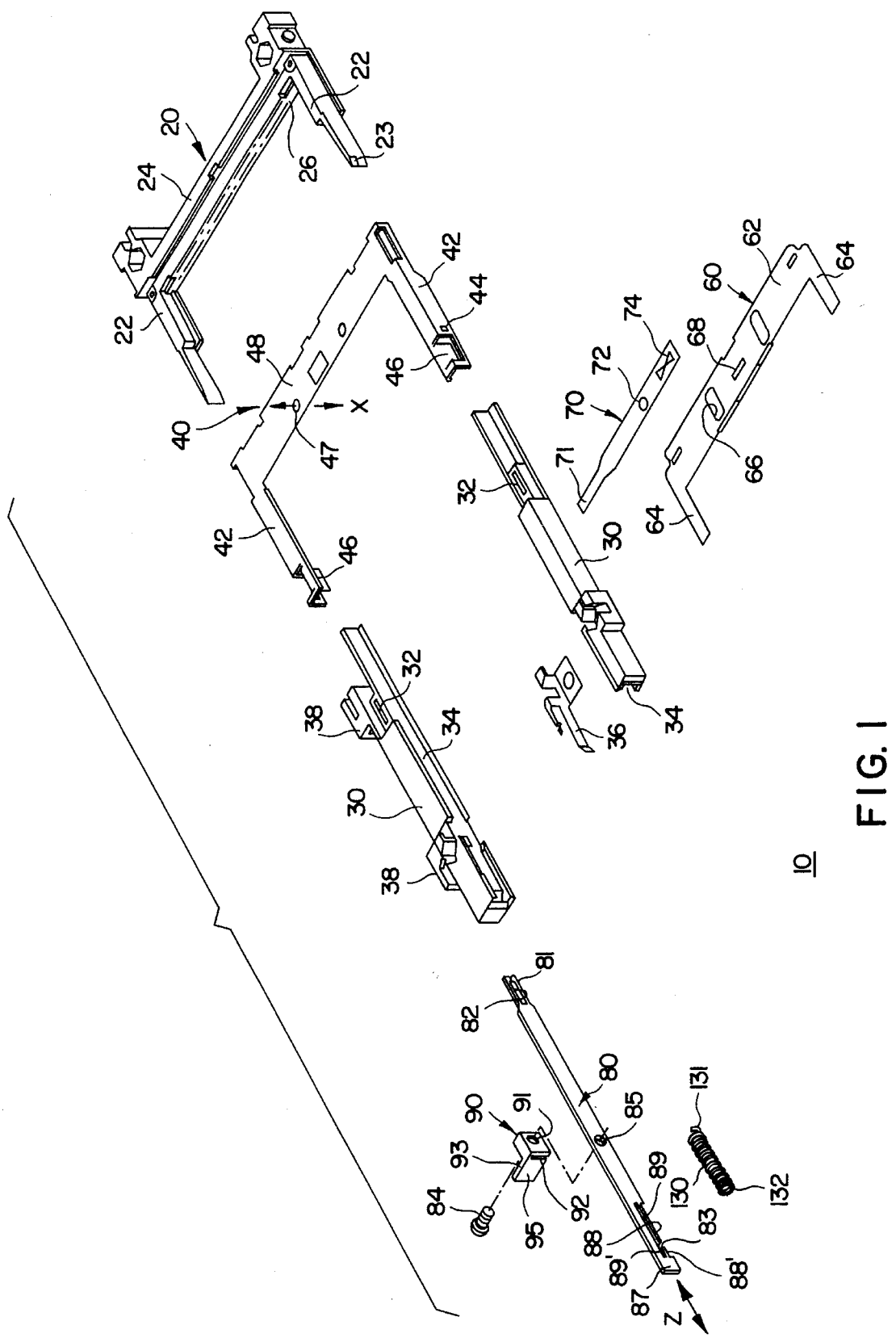
FIG. 1 is an exploded perspective view of a memory card connector of a presently preferred embodiment according to the invention.

It will be noted here that for a better understanding, most of like components are designated by like reference numerals throughout the various figures in the embodiments. Attention is now directed to FIG. 1 wherein a memory card connector 10 is composed of an insulative H-shaped housing 20 associated with two guidance arms 30 by means of a U-shaped reinforcement plate 40. A set of ejection assembly are composed of a sliding plate 60, a pivotable lever 70 and an actuation bar 80. The basic structure of the memory card connector 10 of this embodiment can be referred to co-pending application of Hiroshi Abe of Ser. No. (not available) filed on Aug. 31, 1994.

The insulative housing 20 includes a pair of housing arms 22 extending forwardly from two opposite ends of the housing base 24 in which a plurality of cavities 26 extend therethrough in a front-to-end direction for receiving a corresponding number of contacts (not shown) therein wherein such contacts are adapted to mate the corresponding contacts in the memory card (not shown) which is inserted into the connector 10. The housing 20 can be assembled to the reinforcement plate 40 by means of the protrusions 23 positioned at the distal ends of each arm 22 engaged within the corresponding aperture 44 in the side arm 42 of the reinforcement plate 40. Similarly, the guidance arms 30 can be fastened to the reinforcement plate 40 by means of the retention blades 46 of the side arms 42 of the reinforcement plate 40 interferentially engaged within the corresponding slots 32 in the guidance arms 30, respectively.

Such pair of guidance arms 30 have inward channels 34 facing to each other for guidably sliding the side edges of the inserted memory card therein, and a pair of grounding clips 36 are positioned adjacent to the front ends of the channels 34 for removal of electrostatics on the memory card therefrom.

Figure 2:
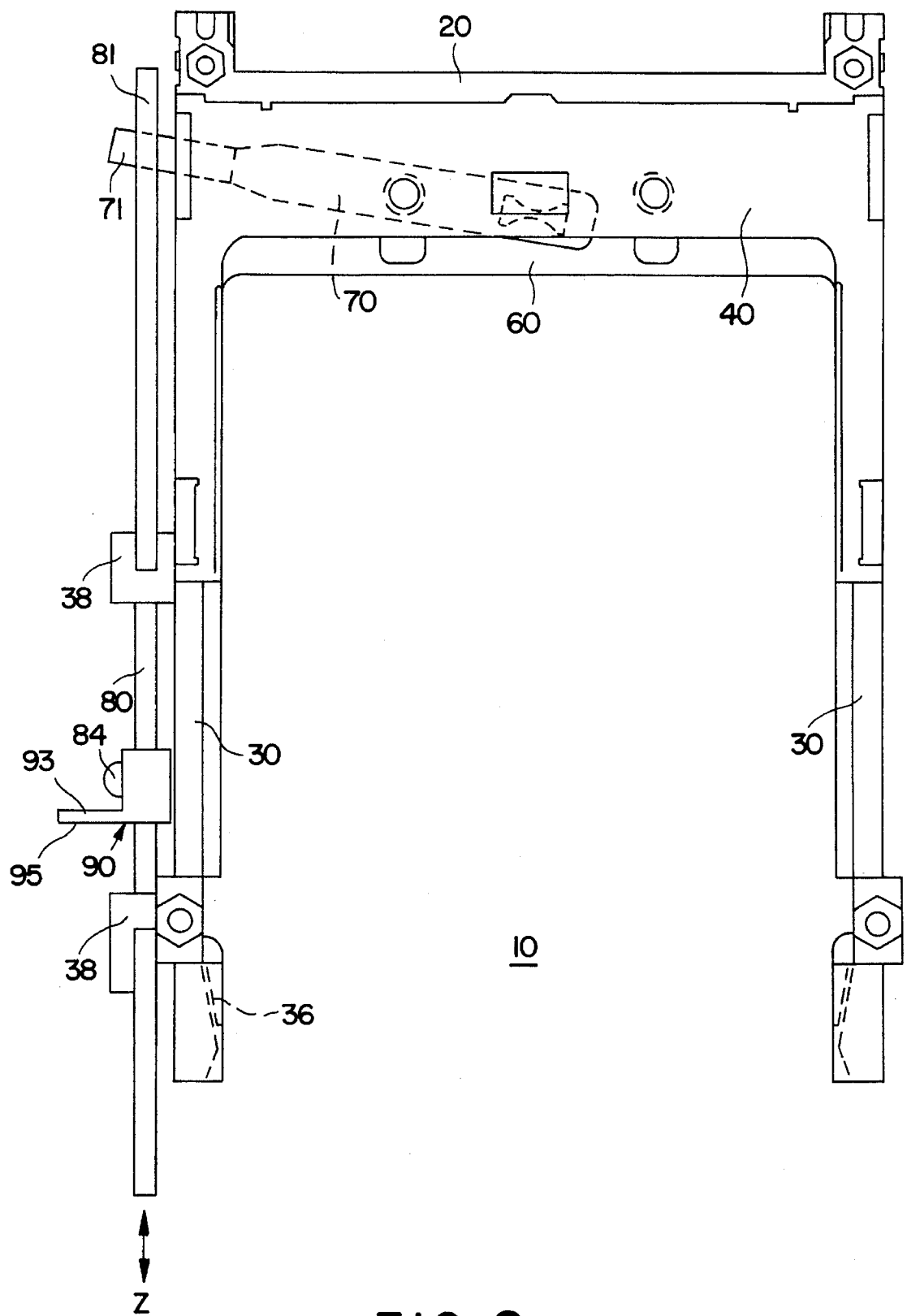
FIG. 2 is a top view of the assembled memory card connector of FIG. 1.
Figure 3:
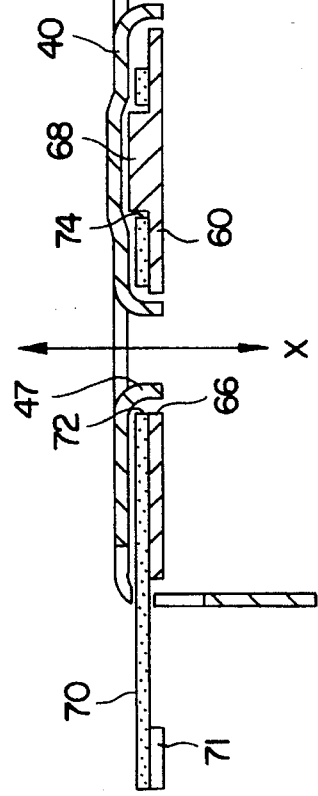
FIG. 3 is a cross-sectional view of the assembly of the reinforcement plate, the sliding plate and the lever sandwiched therebetween in FIG. 1.

Also referring to FIGS. 2 and 3, above the housing 20 and below the reinforcement plate 40 are a sliding plate 60 and the pivotable lever 70. The sliding plate 60 includes a sliding base 62 corresponding to the base 24 of the housing 20 and the base plate 48 of the reinforcement plate 40, and two sliding arms 64 corresponding to the arms 22 of the housing 20 and the side arms 42 of the reinforcement plate 40. In other words, the sliding base 62 of the sliding plate 60 are movably, in the front-to-end direction, sandwiched between the base plate 48 of the reinforcement plate 40 and the housing base 24 of the housing 20; the sliding arms 64 of the sliding plate 40 are movably, in the same direction, sandwiched between the housing arms 24 of the housing 20 and the side arms 42 of the reinforcement plate 40.

Moreover and in detail, the pivotable lever 70 is substantially sandwiched between the sliding plate 60 and the reinforcement plate 40 wherein such lever 70 can be pivoted around the pivoting axis X formed by the circular flange 47 of the reinforcement plate 40 extending through the corresponding conformable hole 72 and the lower expansion opening 66 of the sliding plate 60. Correspondingly, a protrusion tab 68 of the sliding plate 60 extends upwardly for engagement within a corresponding groove 74 of the lever 70. Therefore, the pivotal movement of the lever 70 around the pivoting axis X can result in a back-and-forth movement of the sliding plate 60 by means of such engagement of the tab 68 of the sliding plate 60 with the groove 74 in the lever 70. The principle and application of such linear movement of the sliding plate 60 and the rotation movement of the lever 70 for removal of the inserted memory card are totally disclosed in the most previous memory card connector with ejection mechanism, so such operation will not be discussed hereinafter.

Figure 4:
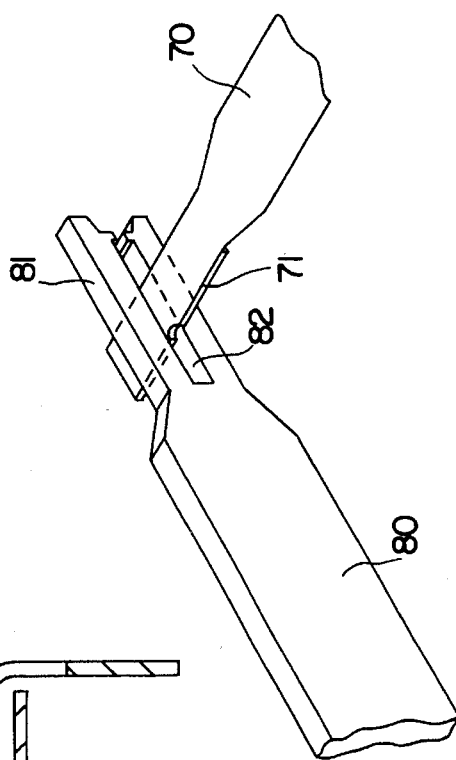
FIG. 4 is an enlarged cut-away perspective view of the assembly of the actuation bar and the lever of FIG. 1 to show the engagement thereof.

The feature of the invention focuses on the actuation bar 80 which is connected to the distal end 71 of such pivotable lever 70. As shown in FIG. 1, the left guidance arm 30 has a pair of supporting shrouds 38 spaced from each other along such guidance arm 30. The actuation bar 80 can extend through such pair of shrouds 38 wherein the distal end 81 of the actuation bar 80 can actuate the lever 70 by means of the distal end 71 of the pivotable lever 70 engaged within the horizontal slit 82 thereof as shown in FIG. 4.

Figure 5:
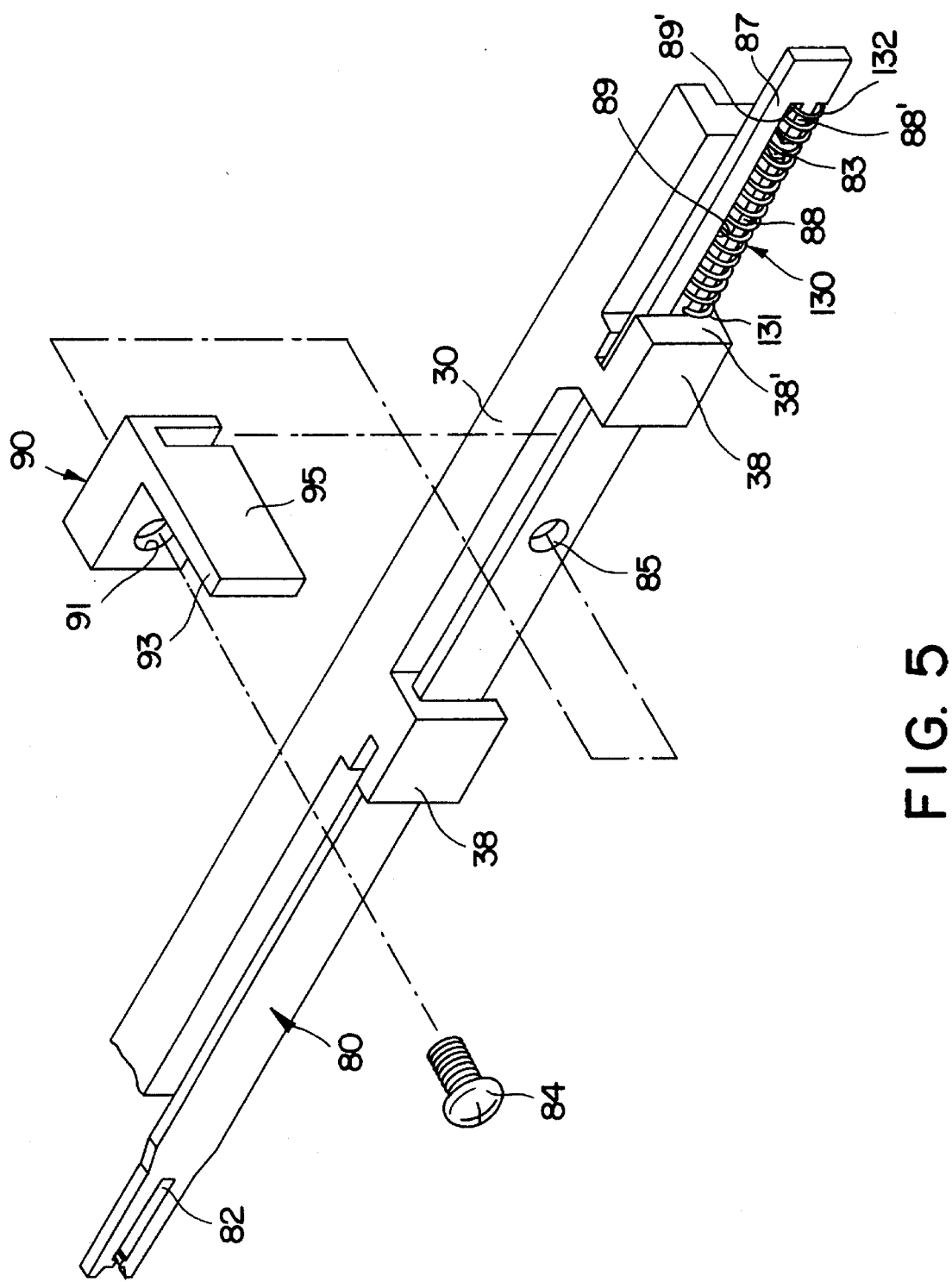
FIG. 5 is a fragmentary perspective view of the memory card connector of FIG. 1 to show the relationship among the pushing block, the actuation bar and the guidance arm of the housing.

Also referring to FIG. 5, such actuation bar 80 is substantially made of metal plate for reducing the (thickness) dimension thereof and maintaining the strength thereof. The middle portion of the actuation bar 80 which is generally positioned between such pair of shrouds 38 of the guidance arm 30 includes a mounting hole 85, and a pushing block 90 can be fastened to the actuation bar 80 via a screw 84 extending through the mounting hole 85 of the actuation bar 80 and the corresponding hole 91 of the pushing block 90. Such pushing block 90 further includes a groove 92 for receiving the strap-like actuation bar 80 therein, and a projecting pushing plate 93 including a vertical pushing surface 95 and extending laterally out of the lengthwise axis Z of the actuation bar 80, and outwardly beyond the shrouds 38 for easy lateral manual access from the exterior for operation.

Figure 6:
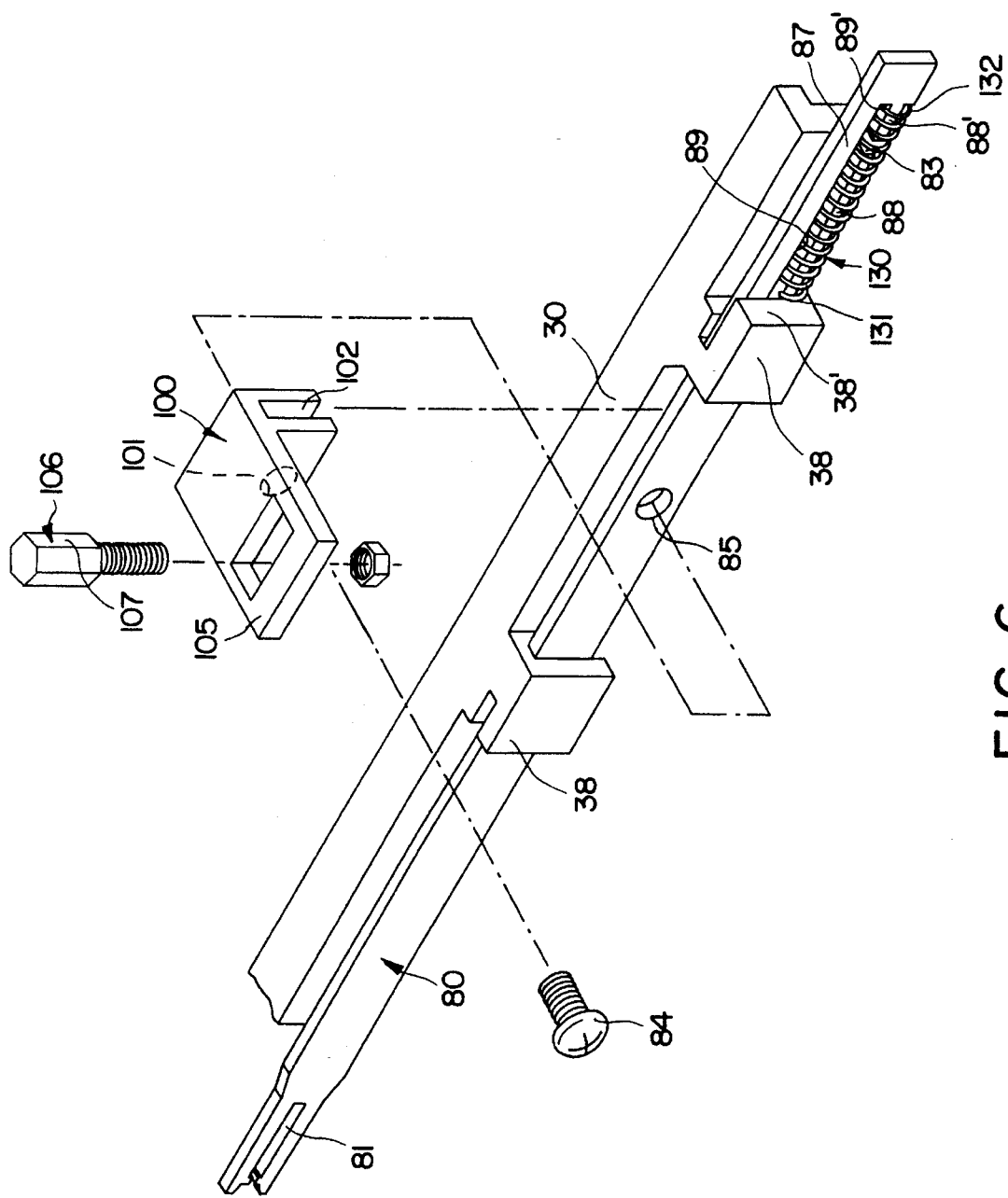
FIG. 6 is a fragmentary perspective view of the memory card connector of the second embodiment of the invention to show a second type pushing block attached to the actuation bar.

Alternatively, referring to FIG.6, another type pushing block 100 can be applied to the actuation bar 80 wherein similar to the pushing block 90, such pushing block 100 includes a groove No. 102 for receiving the strap-like actuation bar 80 therein and a hole 101 for alignment with the mounting hole 82 of the actuation bar 80 for fastening the block 100 to the actuation bar 80 by the screw 84. Differently, the block 100 further includes a projecting horizontal plate 105 having a pushing rod 106 including a vertical pushing surface 107 and extending upwardly for easy upper manual access from the exterior for operation.

Figure 7:
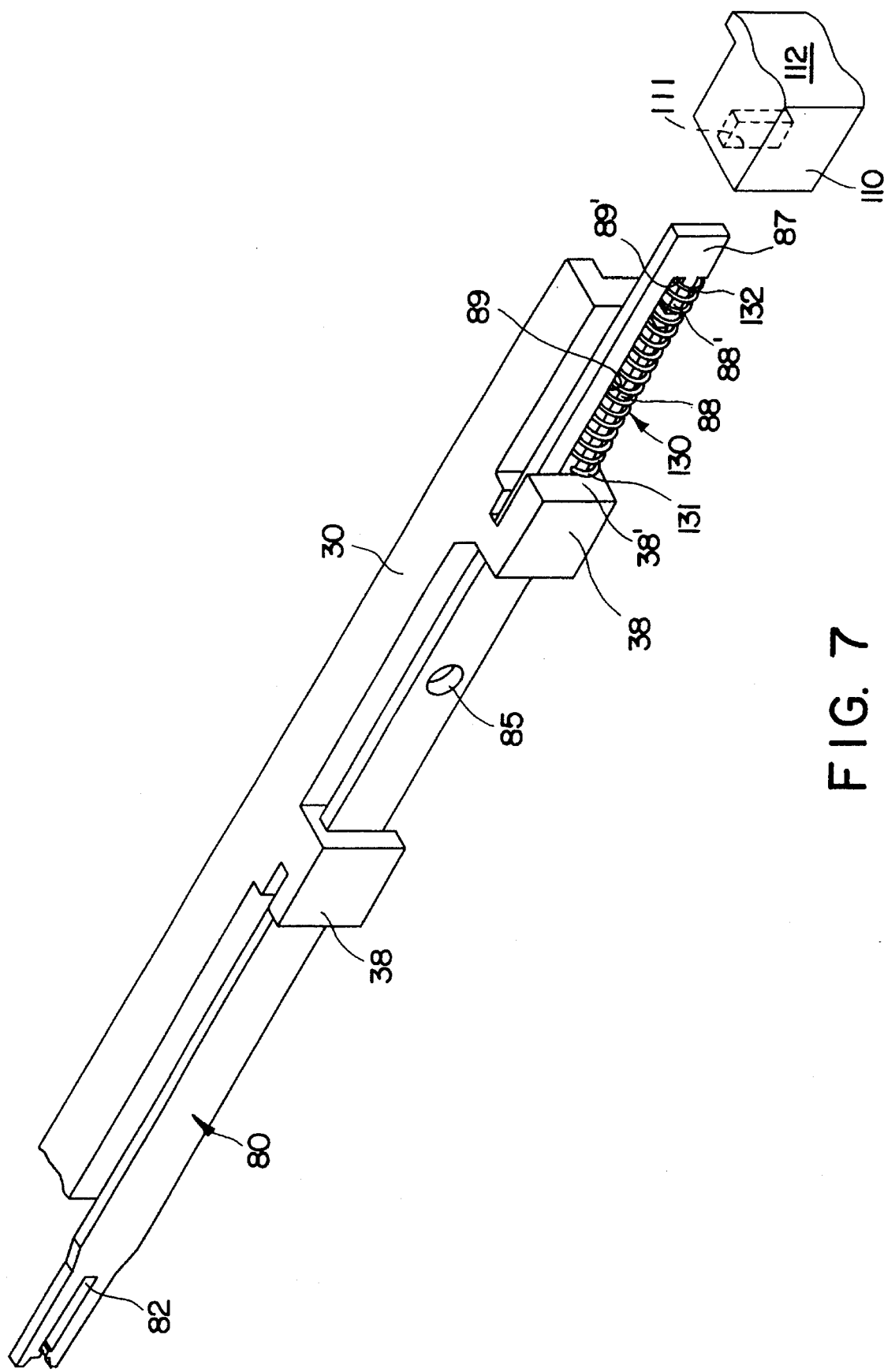
FIG. 7 is a fragmentary perspective view of the memory card connector of the third embodiment of the invention to show a third type pushing block attached to the actuation bar.

The third embodiment of this invention as shown in FIG. 7, wherein the pushing block 110 includes a cavity 111 for receiving the front portion 87 of the actuation bar 80, and a pushing surface 112 vertically extending thereof for easy front manual access from the exterior for operation.

Figure 8:
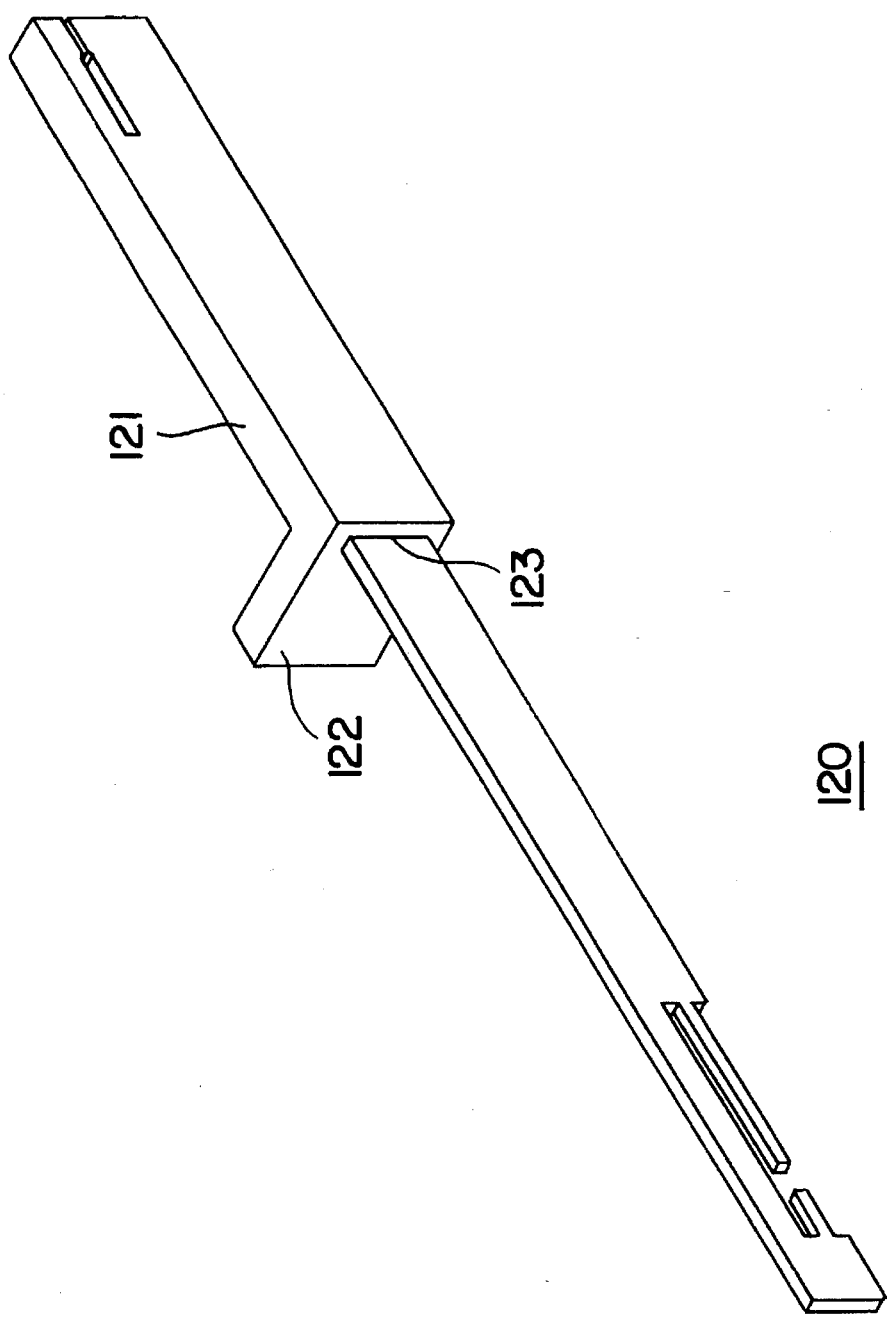
FIG. 8 is a perspective view of an actuation bar and its associated pushing block of the fourth embodiment of the invention.

The above three different embodiments respectively illustrate three different positioned pushing blocks 90, 100, 110 having different pushing surfaces 95, 107, 112 adapted to be attached to the actuation bar 80 for allowing easy operation from different directions, i.e., the front, the upper and the lateral ones. Certainly, the different embodiments or modifications of such pushing blocks can be made based on the spirit of the invention. For example, as shown in FIG. 8, except the rest portion of the actuation bar 120 is still made of metal, the rear portion 121 of the actuation bar 120 can be made of plastic and the pushing block 122 can be formed integral with such rear portion 121 of the actuation bar 120 wherein the distal end 123 of the metal portion of the actuation bar 120 is embedded within the plastic portion of the actuation bar 120.

It can be appreciated that in the invention, diversity of the pushing block provides the memory card connector with broad accommodation of different oriented operations from different directions especially when more than one memory card connectors are stacked together. For example, when three memory card connectors are stacked in alignment with one another vertically, the different type pushing blocks, i.e., the lateral one 90, the upper one 100 and the front one 110, can be attached to such three connectors, respectively, for easily accessible operation. In contrast, most conventional memory card connectors only provide the ejector means with the front approach, and that may preclude easy operation when several compact size memory card connectors are stacked together. Furthermore, using the separate pushing block in a specific position along the lengthwise direction of the actuation bar, can allow such pushing blocks to be positioned in different lengthwise positions with regard to the corresponding actuation bars. In other words, the pushing blocks of the upper connector and the lower connector can be arranged in a staggered manner for easily accessible operation. This feature can not achieved by the most conventional memory card connectors which use the traditional ejector mechanism having the pushing or operation section only at the longitudinal outermost end.

The invention also includes two other features in comparison with the prior art memory card connectors. The first is that a spring device 130 can be optionally and easily assembled to the actuation bar when required by the user from the exterior without any inconvenience even though the whole connector assembly has been assembled. This is implemented by means that, referring to FIGS. 1 and 5–8, the front portion 87 of the metal actuation bar 80 includes a slot 89 along its lengthwise direction, and further includes a passage 83 cutting the corresponding front portion 87 of the actuation bar 80 from the exterior for communicating such slot 89 with the exterior. Because such passage 83 breaks the front portion 87 of the actuation bar 80 in an uneven manner, a long cantilever beam 88 and a short cantilever beam 88' are formed thereof. Thus, the spring device 130 which is of coil shape, can be loaded onto such front portion 87 of the actuation bar 80 by means that the end of the spring 130 first gets into the passage 83 and then the whole coil spring 130 surrounds the long beam 88 and the short beam 88'. The rear end 131 of the spring 130 abuts against the front surface 38' of the front shroud 38 and the front end 132 of the spring 130 abuts against the front portion of the actuation bar 80 around the front end 89' of the slot 89, thus providing an elastic function for moving the actuation bar 38 back to its original front position after every time the actuation bar 38 is pushed rearwardly and such coil spring 130 is compressed. Because of the spring 130, the actuation bar 80 always is positioned at the front position. It is also noted that the stroke of the actuation bar corresponds to the rotation angle of the pivotal lever 70 because the rear end 81 of the actuation bar 80 and the distal end 71 of the lever 70 are engaged with each other.

Figure 9:
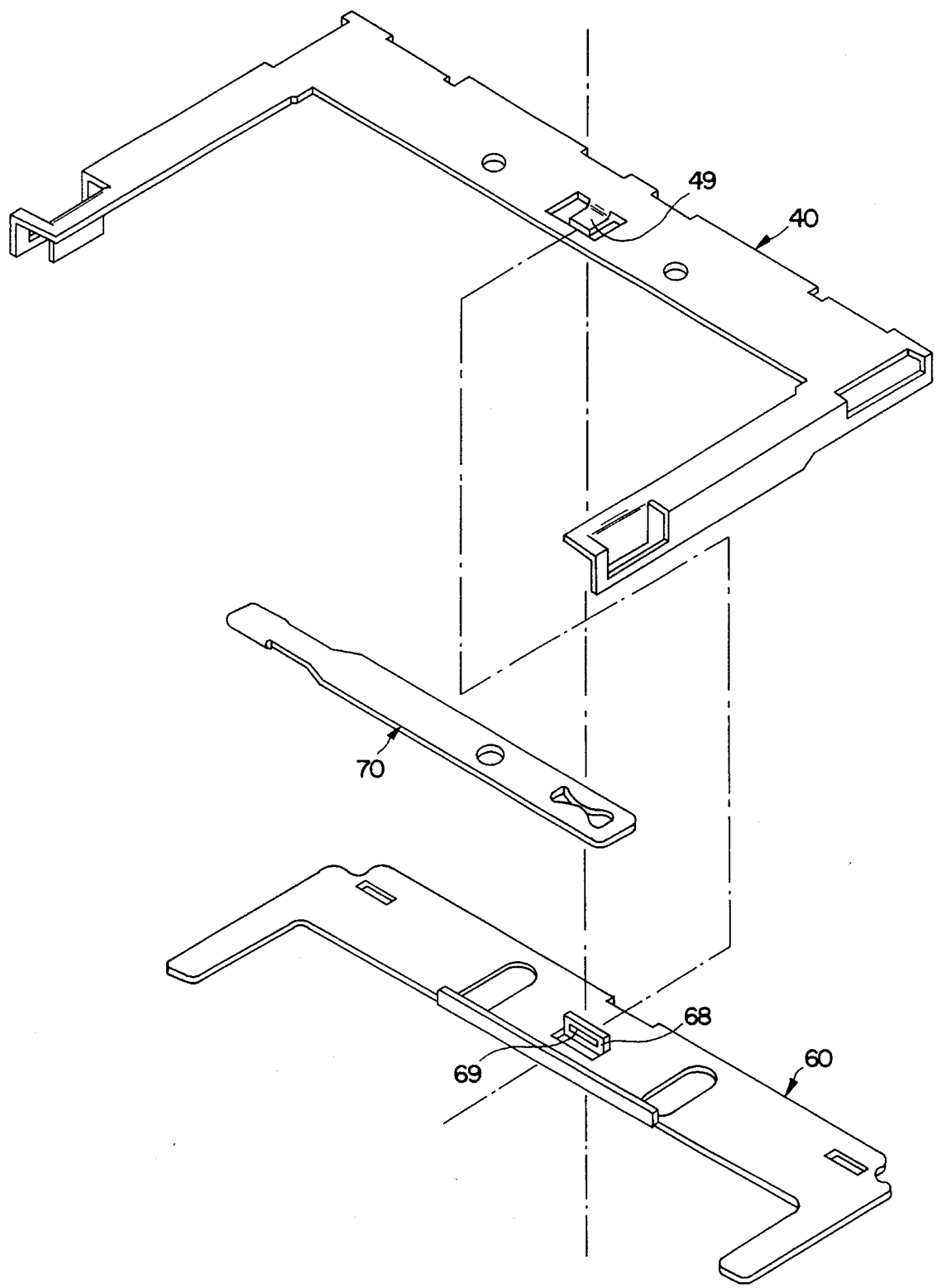
FIG. 9 is a perspective view of the fifth embodiment of the assembly of the reinforcement plate, the sliding plate and the lever sandwiched therebetween.

It is seen that in another embodiment as shown in FIG. 9, there is a locking tang 49 extending of the reinforcement plate 40 for engagement within a locking slot 69 of the upwardly projecting tab 68 of the sliding plate 60 wherein the pivotable lever 70 is sandwiched therebetween, thus assuring that the sliding plate 60 can be moved back-and-forth according to the lever 70 in a liable guiding manner.

It is also appreciated that in the invention, the pushing blocks 90, 100 or 110 can be selectively and detachably attached to the actuation bar 80, thus providing the whole memory card connector assembly with flexible manufacturing benefits to save the manufacturing cost.

While the present invention has been described with reference to specific embodiments, the description is illustrative of the invention and is not to be construed as limiting the invention. Various modifications to the present invention can be made to the preferred embodiments by those-skilled in the art without departing from the true spirit and scope of the invention as defined by the appended claims.

Therefore, persons of ordinary skill in this field are to understand that all such equivalent structures are to be included within the scope of the following claims.

What is claimed is:

1. A memory card connector with ejection mechanism for use with a memory card, comprising:

a housing including a plurality of contacts therein for electrical and mechanical engagement with a corresponding number of contacts of the said memory card which is inserted into the housing;

said ejection mechanism including a pivotable lever adapted to be rotatable with regard to the housing, and an actuation bar adapted to be linearly moveable with regard to the housing in a direction which complies with an insertion direction of said memory card into said housing, a rear end of said actuation bar being engaged with said lever; wherein pushing means can be selectively attached to said actuation bar and said pushing means includes a pushing block, which actuates the actuation bar, being actuatable from alternative directions.

2. The memory card connector as described in claim 1, wherein said connector comprises a pair of guidance arms, one of which further includes a pair of shrouds for supportably receiving the actuation bar therein.

3. The memory card connector as described in claim 1, wherein said actuation bar is of a strap type, and said pushing means includes a groove for receiving said actuation bar therein and fastened thereto by a screw.

4. The memory card connector as described in claim 1, wherein a spring means can be attached to said actuation bar along a lengthwise direction thereof.

5. The memory card connector as described in claim 1, wherein said ejection mechanism further includes a sliding plate adapted to be moved with regard to the housing in the said direction.

6. The memory card connector as described in claim 5, wherein said connector further comprises a reinforcement plate fastened to the housing for sandwiching said lever and said sliding plate therebetween.

7. A retractable ejector mechanism for use with a memory card connector comprising at least one pivotable lever adapted to be rotatable with regard to a housing of said memory card connector, and one actuation bar adapted to be linearly moved with regard to the housing of the connector in a longitudinal direction which is compliant with an insertion direction of a memory card adapted to be inserted into said memory card connector, said lever adapted to be actuated to move by said actuation bar, said actuation bar further comprising a pushing surface which laterally projects with regard to and substantially is perpendicular to a lengthwise axis of said actuation bar, wherein a spring device can be optionally attached to said actuation bar in said longitudinal direction, and said spring device surrounds a portion of said actuation bar.

8. The retractable ejector mechanism as described in claim 7, wherein said actuation bar includes a lengthwise slot along its longitudinal direction, said slot communicating with the exterior through a passage, thus forming at least one cantilever beam of the actuation bar, whereby said spring device is of a coil type which can surround said beam and be retained within the slot of the actuation bar.

9. The retractable ejector mechanism as described in claim 7 wherein said pushing surface is defined by a pushing block adapted to be detachably attached to said actuation bar.

10. A memory card connector with ejection mechanism for use with a memory card, comprising:

a housing including a plurality of contacts therein for electrical and mechanical engagement with a corresponding number of contacts of the said memory card which is inserted into the housing;

a reinforcement plate positioned on the housing;

said ejection mechanism including a pivotable lever adapted to be rotatable with regard to the housing, and an actuation bar and a sliding plate both adapted to be linearly moveable with regard to the housing in a direction conformable to an insertion direction of said memory card, a rear end of said actuation bar being engaged with a first end of said lever, and the sliding plate being engaged with a second end of said lever; wherein said lever is sandwiched between said reinforcement plate and said sliding plate, and said reinforcement plate includes a tang extending through a slot in a tab vertically extending from the sliding plate, and wherein a pushing block, which actuates the actuation bar to eject the inserted memory card, is actuatable from alternative directions.

11. The memory card connector as described in claim 10, wherein said actuation bar further includes a pushing surface protruding beyond a shroud of a guidance arm along a lengthwise axis of said guidance arm.

12. The memory card connector as described in claim 11, wherein said pushing surface is defined by a pushing block.

13. A memory card connector with ejection mechanism for use with a memory card, comprising:

a housing including a plurality of contacts therein for electrical and mechanical engagement with a corresponding number of contacts of the said memory card which is inserted into the housing;

a reinforcement plate positioned on the housing;

said ejection mechanism including a pivotable lever adapted to be rotatable with regard to the housing, and an actuation bar and a sliding plate both adapted to be linearly moveable with regard to the housing in a direction conformable to an insertion direction of said memory card, a rear end of said actuation bar being engaged with a first end of said lever, and the sliding plate being engaged with a second end of said lever; wherein said lever is sandwiched between said reinforcement plate and said sliding plate, and said reinforcement plate includes a tang extending through a slot in a tab vertically extending from the sliding plate, and wherein the actuation bar has a coil spring device optionally attached in a longitudinal direction and said spring device surrounds a portion of the actuation bar.

* * * * *